United States Patent
Carothers et al.

(10) Patent No.: US 8,714,309 B2
(45) Date of Patent: May 6, 2014

(54) HIGH PRESSURE LUBRICATION SYSTEM

(75) Inventors: Todd Carothers, Spring, TX (US); Cory Walker, The Woodlands, TX (US); William H. Pullin, Broken Arrow, OK (US); Terry Bennett, Houston, TX (US)

(73) Assignee: TF Hudgins, Inc., Houston, TX (US)

( * ) Notice: Subject to any disclaimer, the term of this patent is extended or adjusted under 35 U.S.C. 154(b) by 162 days.

(21) Appl. No.: 13/145,452

(22) PCT Filed: Jan. 20, 2010

(86) PCT No.: PCT/US2010/021503
§ 371 (c)(1),
(2), (4) Date: Aug. 2, 2011

(87) PCT Pub. No.: WO2010/085489
PCT Pub. Date: Jul. 29, 2010

(65) Prior Publication Data
US 2011/0308888 A1 Dec. 22, 2011

Related U.S. Application Data (60) Provisional application No. 61/146,224, filed on Jan. 21, 2009.

(51) Int. Cl.
*F16N 29/04* (2006.01)
*F16N 7/38* (2006.01)
*F16N 29/02* (2006.01)

(52) U.S. Cl.
USPC .......................................................... 184/6.1

(58) Field of Classification Search
USPC ................................ 184/6.1; 123/446; 92/153
See application file for complete search history.

(56) References Cited

U.S. PATENT DOCUMENTS

| | | | | |
|---|---|---|---|---|
| 2,294,830 | A | | 9/1942 | Brown |
| 3,876,037 | A | * | 4/1975 | Rath, Jr. ...................... 184/6.4 |
| 4,012,012 | A | | 3/1977 | Ligler |
| 4,520,902 | A | * | 6/1985 | Snow ............................ 184/7.4 |
| 4,913,108 | A | | 4/1990 | Sougawa |
| 5,102,567 | A | | 4/1992 | Wolf |
| 5,996,739 | A | * | 12/1999 | Hoffmann ..................... 184/7.4 |
| 2004/0255656 | A1 | * | 12/2004 | Rafei ........................... 73/118.1 |
| 2006/0201484 | A1 | * | 9/2006 | Shafer et al. ................. 123/456 |
| 2007/0283929 | A1 | * | 12/2007 | Funabashi et al. ........... 123/446 |

OTHER PUBLICATIONS

Lubriquip, Inc., Trabon and Mazel Cycle-Indicator Proximity Switches, Product Specs and Ordering, Bulletin 15600, revised Nov. 2004.
Heypac, KR Series Brochure, Nov. 18, 2008.
Lubriquip, Inc., Trabon and Mazel MH Modular Divider Valves, Product Specs and Ordering, Bulletin 10103, revised Nov. 2004.

(Continued)

*Primary Examiner* — William E Dondero
*Assistant Examiner* — Mark K Buse
(74) *Attorney, Agent, or Firm* — Nielsen IP Law LLC (57) ABSTRACT

An improved lubrication system for use in connection with high pressure processing and particularly useful for LDPE processing. The lubricating system utilizes flow meters to monitor and control the supply pressure and oil flow to a machine lubrication point. Furthermore, two different types of oil may be used so as to alleviate down time and repair often associated with use of food grade oil as the lubricate for the camshaft and other working components of the lubrication system.

5 Claims, 5 Drawing Sheets (56) References Cited

OTHER PUBLICATIONS

Lubriquip Inc., Mazel Force Feed Box Lubricators, Product Specs and Ordering, Bulletin 51020, revised May 1998.
TF Hudgins, Inc., Reciprocating Compressor Lubricating System Monitor, Jul. 2011.
Ilsa Mexico, Box Lubricators and Compressor System, brochures, Jan. 18, 2009.
Graco, Manzel Model HP-15 High Pressure Lubricators, Bulletin 40230, Mar. 2002.
Alemite, Carbon Shield, Atomized Oil Lubrication, Jan. 17, 2009.
Luibriquip, Inc., Manzel High Pressure Lubricators Product Specs and Ordering, Bulletin 51030, revised Nov. 1987.
Luibriquip, Inc., Manzel Model HP-15 High Pressure Lubricators Product Service/Maintenance, Bulletin 40230, revised Jan. 1990.

* cited by examiner

HIGH PRESSURE LUBRICATION SYSTEM

CROSS-REFERENCE TO RELATED APPLICATIONS

This international patent application claims priority to U.S. patent application Ser. No. 61/146,224 filed Jan. 21, 2009 which is incorporated by reference in its entirety.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION BY REFERENCE OF MATERIAL SUBMITTED ON A COMPACT DISC

None.

REFERENCE TO SEQUENCE LISTING

None.

BACKGROUND OF THE INVENTION

High pressure lubricating systems deliver lubricant to one or more points of use, and include force feed box lubricators and other systems that are self-contained and provide an economical, convenient and reliable method of dispensing lubrication to pumps and compressors High pressure lubricating systems are often used in connection with reciprocating gas compressors. Reciprocating gas compressors are used in many industries and compress many different types of gases at high pressures. One of the most critical and demanding lubrication applications is high-pressure lubrication delivery to low density polyethylene resins (LDPE) compressors. In the LDPE manufacturing process, polyethylene can reach pressures as high as 55,000 PSI. Hence, the supply of a precise volume of lubricant is critical to the operation of the compressor and for extending the component life. Further, because of the nature of the end product, food grade oil must be utilized to lubricate the LDPE compressors.

Sealed pumping units such as force feed box lubricators have the advantage that they are relatively easy to remove for servicing with dissembling the complete lubricator from the installation. The units also allow for individual pumps to be added or changed in order to alter the number of pumps needed or the pressure rating of the individual feeds. Despite these advantages, currently, lubricator pumping units are fitted with integral sight feed showing the flow of lubricant into each line. Flow cannot be accurately measured or confirmed. Furthermore, use of food grade oil causes excessive wear on lever bushings and camshafts which leads to mechanical failures of these parts. Often metals come off these parts and end up in the oil reservoir and are carried to the compressor pump.

BRIEF SUMMARY OF THE INVENTION

The lubricating system described herein provides the ability to accurately monitor lubricant flow to a machine injection point and further improves the current state of the art of lubrication delivery to machines operating under high pressure by featuring dual oil reservoirs that can hold various oil types to eliminate maintenance and wear problems. Use of a pressurized feed pump and one or more filters further promotes the life of the lubricating system and prevents unnecessary equipment and process downtime. This lubricating system also provides computer operated monitoring and control systems to monitor individual lube point alarms, warning of an immediate loss of lubrication and control the amount of lubricant sent to the injection machine point.

DETAILED DESCRIPTION OF THE INVENTION

Figure 1:
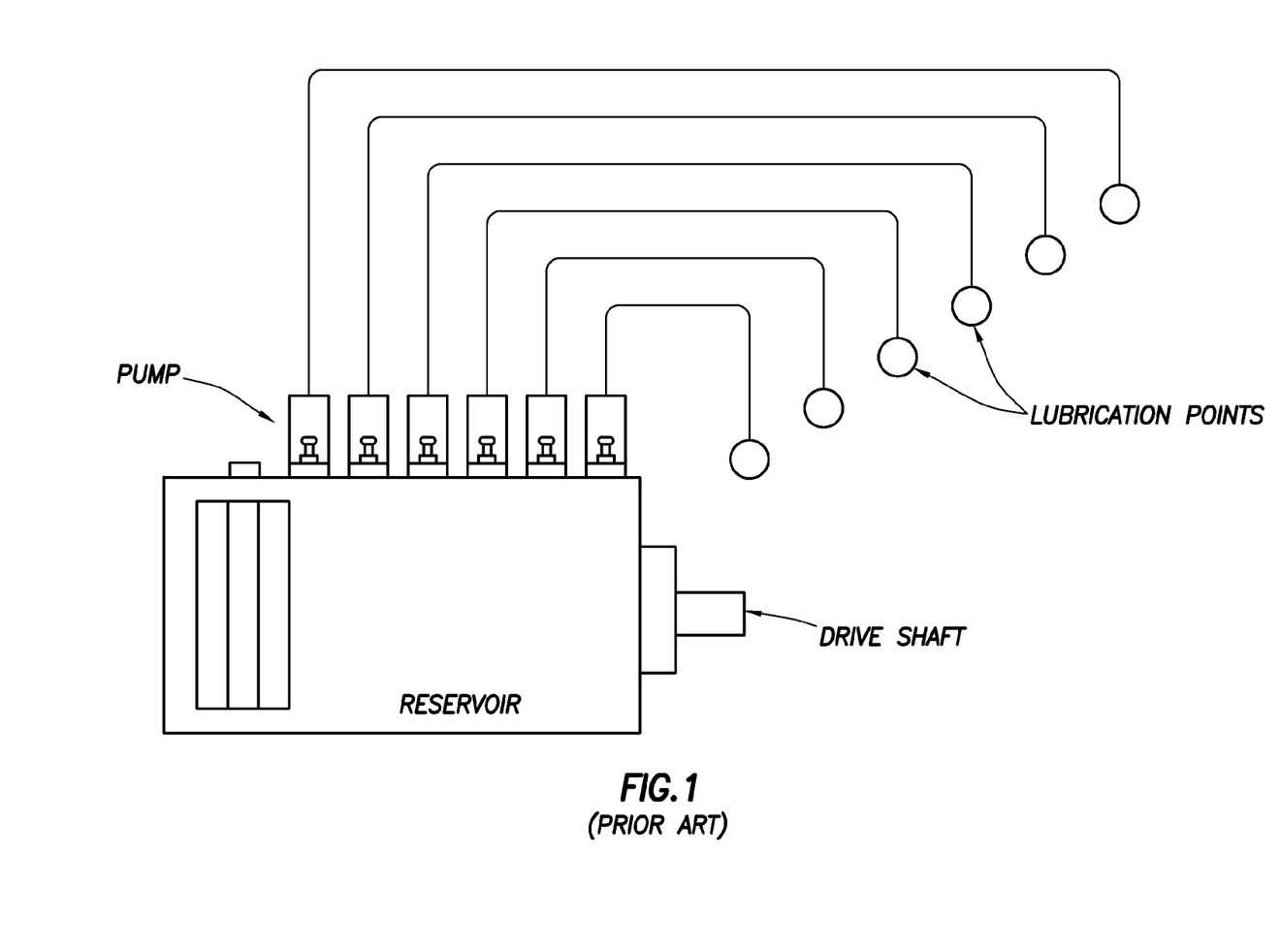
FIG. 1 depicts a prior art lubricating system, a force feed box lubricator.
Figure 2:
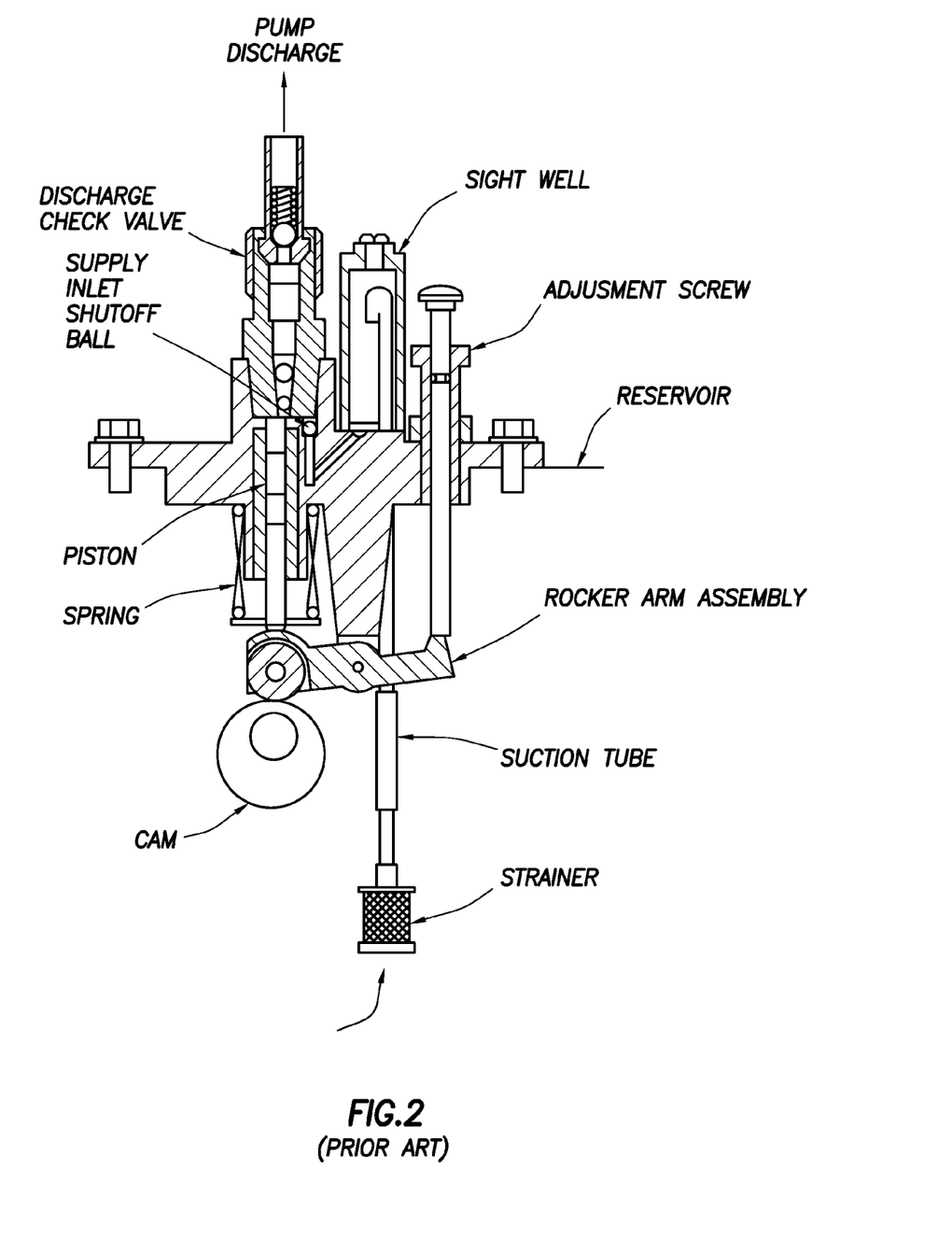
FIG. 2 depicts a prior art piston pump used in a force feed box lubricator.

Lubrication is important for the operation of the valve. In a high pressure system, the lubricating system must overcome operating pressures as high as 55,000 psi in order to inject lubricant into a reciprocating gas compressor cylinder or other high pressure pumps. Therefore, the lubrication pumps used in connection with the lubrication system described herein are rated to reach pressures of 60,000 psi One type of prior art "pump-to-point" high pressure lubricating system is known as a force feed box lubricator. This type of closed loop lubrication system utilizes one or more suction feed pumps (also known as piston pumps) mounted on a common reservoir. As shown in FIG. 1, each of these piston pumps is capable of pumping small flows of either mineral or synthetic oil (food grade) to a single machinery injection point. As shown in FIG. 2, the piston pumps are typically operated by individual cams on a single camshaft (sometimes referred to as crankshaft) which are adjustable on a scale of 1 to 30 drops per stroke. The camshaft intermediate support bearings are bottom mounted to an inside channel within the reservoir to provide maximum rigidity without adding length. In operation, rotation of the camshaft actuates a lever or the pump rocker arm to operate the pump piston. On the piston down-stroke, spring pressure is exerted on the pump piston causing it to follow the camshaft. As the camshaft moves down, a pressure reduction is created between the piston and the check valve and the valve closes. On the piston up-stroke, the oil in the cylinder is injected out through the discharge check valve to the machine injection point.

Negative pressure is created in the cylinder on the down stroke of the pump piston, positively seating the spring-loaded poppet discharge valve and opening the inlet port from the sight chamber well. (FIG. 2) This causes the fluid in the sight chamber well to flow into the depressurized pump cylinder, creating a reduction of pressure in the sight feed chamber. As a result of this pressure imbalance, a visually metered amount of oil is forced up through the drip tube into the sight well. On the upstroke, the piston (as sometimes referred to as a plunger) closes the inlet port and the oil is forced under system pressure over the poppet discharge valve to the machine injection point (i.e., the point of lubrication at the reciprocating gas compressor). The inlet port provides an annular ring around the plunger and a channel to a sight/feed chamber. Any loss of lubricant between the plunger and cylinder on the discharge stroke returns to the sight/feed chamber even though the amount of lubricant seen leaving the drip tube is considered equivalent to that sent to the machine injection point.

Current lubricating systems are prone to fail for many reasons. First the compressor lubricating oil in the reservoir is also used as the lubricant used for the lever/bushing and camshaft interface. These systems are used in LDPE process that require food grade lubricants such as mineral oil which are poor load bearing oils and can break down under extreme pressures. Due to the poor performance of this type of oil, excessive wear begins to happen on the lever bushing and camshaft which leads to mechanical failures of these parts. In addition, the wear metals that come off these parts end up in the reservoir and are carried into the pump. In order to reach high pressure, the pumps have extremely close tolerances on the metal to metal seals between the piston and the cylinder. Metal debris will score these surfaces and cause pump failure. Further, it is difficult to measure the amount of lubricant that is actually getting to the machine point. Currently, an operator counts the number of drops in the sight glass over time. The drops per minutes are converted to pints per day manually. Hence there are problems with these methods and devices, particularly human error and level of accurately monitoring the amount of lubricant getting to the machine point.

Figure 3:
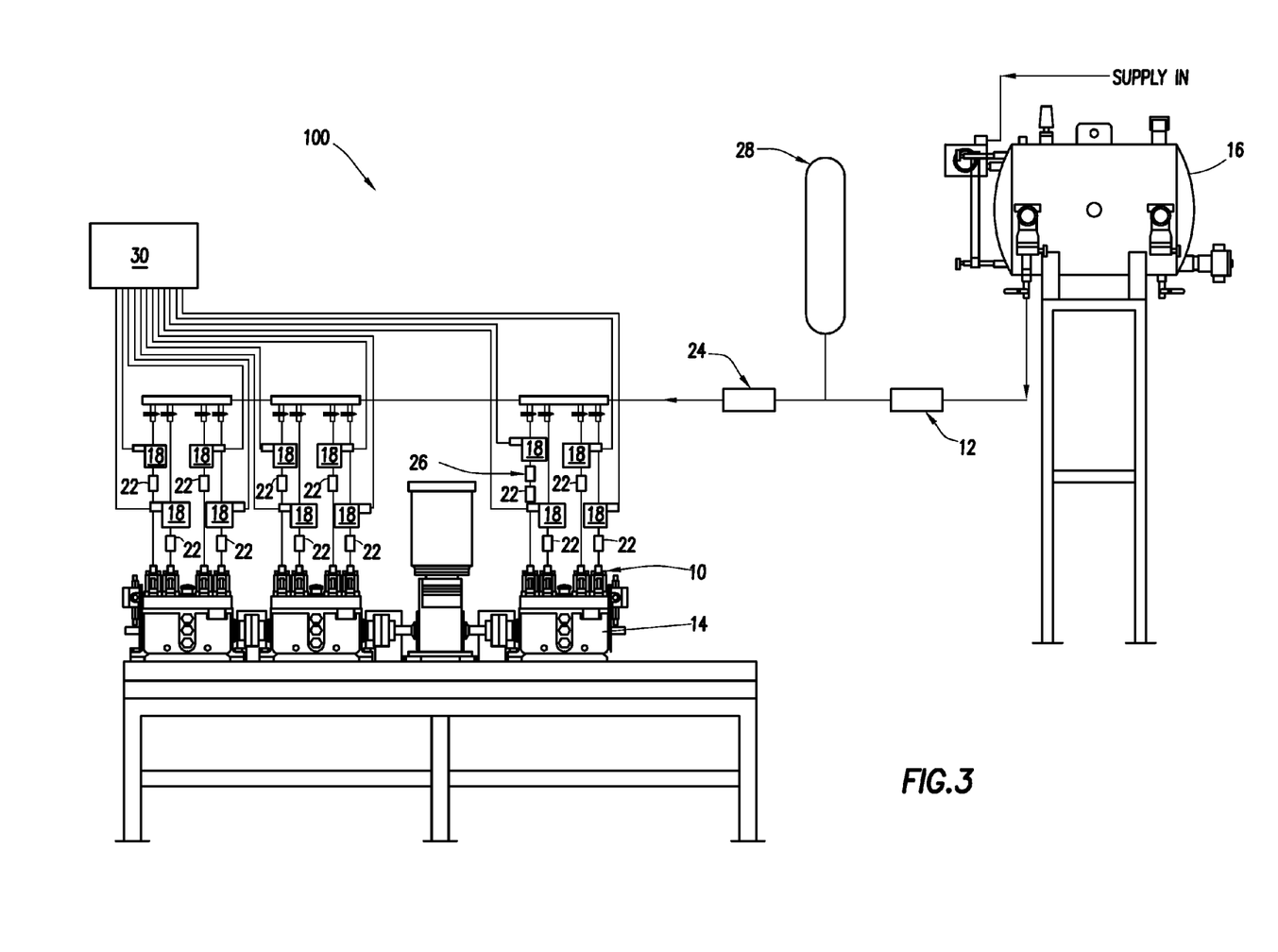
FIG. 3 provides a schematic of the high pressure lubricating system provided herein.

FIG. 3 depicts the improved lubricating system 100 provided herein. This high pressure lubricating system comprises one or more pressurized feed pumps 10 (also referred herein as a "high pressure lubrication pump"), a low pressure or high pressure supply pump 12, a first reservoir 14 holding lubricant for use by the pressurized feed pump, a second reservoir 16 ("also referred to as the "feed reservoir"), a flow meter 18, a regulating valve 22, a post-filter 26, a pressure relief valve 28 and an electronic monitoring system 30. The post-filter 26 can be located between the outlet of the flow meter 18 and the inlet of the regulating valve 22. An optional second reservoir for high pressure (not shown) may also be used. The high pressure and low pressure supply pumps can be driven pneumatically, hydraulically, or electrical. Furthermore, the lubrication system can use an additional filter, a pre-filter 24 located upstream of the flow meter 18.

In operation, the second reservoir 16 contains the food grade oil which is pumped through the flow meter 18 via the low pressure supply pump 12 and through the post filter 26 to filter possible containments. A pre-filter 24 positioned prior to the low pressure supply pump 12 may optionally be used. The low pressure supply pump 12 provides sustained pressure to the flow meter 18 and can provide power on demand. The pressure of lubricant provided from the flow meter 18 is between about 75 to 10,000 psi. The low pressure supply pump 12 can be an air operated or hydraulic or electric operated, providing fluid to air pressure ratios from 5 to 80:1. One such pump is currently manufactured by HEYPAC of Great Britain. Other useful pumps includes those manufactured by Haskell, Trabon, Lincoln, Faval, Alemite and Parker-Hannifin.

Numerous types of flow meters are available for closed-piping systems. Hence, the types of flow meters that may useful in the lubricating system provided herein are described in detail by Seil Enterprise Co under the Maxiflo trademark mark and on its website at: http://www.maxiflo.co.kr/English/Technology/flowmetertypes.htm#Orifices. This information is incorporated herein by reference in its entirety as provided immediately below.

In general, the equipment can be classified as differential pressure, positive displacement, velocity, and mass meters. Differential pressure devices (also known as head meters) include orifices, venturi tubes, flow tubes, flow nozzles, pilot tubes, elbow-tap meters, target meters, and variable-area meters. Positive displacement meters include piston, oval-gear, nutating-disk, and rotary-vane types. Velocity meters consist of turbine, vortex shedding, electromagnetic, and sonic designs. Mass meters include Coriolis and thermal types. The measurement of liquid flows in open channels generally involves weirs and flumes.

The use of differential pressure as an inferred measurement of a liquid's rate of flow is well known. Differential pressure flow meters are, by far, commonly in use today. Estimates are that over 50 percent of all liquid flow measurement applications use this type of unit.

The basic operating principle of differential pressure flowmeters is based on the premise that the pressure drop across the meter is proportional to the square of the flow rate. The flow rate is obtained by measuring the pressure differential and extracting the square root. Differential pressure flow meters, like most flow meters, have a primary and secondary element. The primary element causes a change in kinetic energy, which creates the differential pressure in the pipe. The unit must be properly matched to the pipe size, flow conditions, and the liquid's properties. And, the measurement accuracy of the element must be good over a reasonable range. The secondary element measures the differential pressure and provides the signal or read-out that is converted to the actual flow value.

Orifices are one of the most popular liquid flow meters in use today. An orifice is simply a flat piece of metal with a specific-sized hole bored in it. Most orifices are of the concentric type, but eccentric, conical (quadrant), and segmental designs are also available. In practice, the orifice plate is installed in the pipe between two flanges. Acting as the primary device, the orifice constricts the flow of liquid to produce a differential pressure across the plate. Pressure taps on either side of the plate are used to detect the difference. Major advantages of orifices are that they have no moving parts and their cost does not increase significantly with pipe size. Conical and quadrant orifices are relatively new. The units were developed primarily to measure liquids with low Reynolds numbers. Essentially constant flow coefficients can be maintained at R values below 5000. Conical orifice plates have an upstream bevel, the depth and angle of which must be calculated and machined for each application.

The segmental wedge is a variation of the segmental orifice. It is a restriction orifice primarily designed to measure the flow of liquids containing solids. The unit has the ability to measure flows at low Reynolds numbers and still maintain the desired square-root relationship. Its design is simple, and there is only one critical dimension the wedge gap. Pressure drop through the unit is only about half that of conventional orifices. Integral wedge assemblies combine the wedge element and pressure taps into a one-piece pipe coupling bolted to a conventional pressure transmitter. No special piping or fittings are needed to install the device in a pipeline. Metering accuracy of all orifice flow meters depends on the installation conditions, the orifice area ratio, and the physical properties of the liquid being measured.

Venturi tubes have the advantage of being able to handle large flow volumes at low pressure drops. A venturi tube is essentially a section of pipe with a tapered entrance and a straight throat. As liquid passes through the throat, its velocity increases, causing a pressure differential between the inlet and outlet regions.

The flowmeters have no moving parts. They can be installed in large diameter pipes using flanged, welded or threaded-end fittings. Four or more pressure taps are usually installed with the unit to average the measured pressure. Venturi tubes can be used with most liquids, including those having a high solids content.

Flow tubes are somewhat similar to venturi tubes except that they do not have the entrance cone. They have a tapered throat, but the exit is elongated and smooth. The distance between the front face and the tip is approximately one-half the pipe diameter. Pressure taps are located about one-half pipe diameter downstream and one pipe diameter upstream.

Flow Nozzles, at high velocities, can handle approximately 60 percent greater liquid flow than orifice plates having the same pressure drop. Liquids with suspended solids can also be metered. However, use of the units is not recommended for highly viscous liquids or those containing large amounts of sticky solids.

Pitot tubes sense two pressures simultaneously, impact and static. The impact unit consists of a tube with one end bent at right angles toward the flow direction. The static tube's end is closed, but a small slot is located in the side of the unit. The tubes can be mounted separately in a pipe or combined in a single casing.

Pitot tubes are generally installed by welding a coupling on a pipe and inserting the probe through the coupling. Use of most pitot tubes is limited to single point measurements. The units are susceptible to plugging by foreign material in the liquid. Advantages of pitot tubes are low cost, absence of moving parts, easy installation, and minimum pressure drop.

Elbow tap meters operate on the principle that when liquid travels in a circular path, centrifugal force is exerted along the outer edges. Thus, when liquid flows through a pipe elbow, the force on the elbow's interior surface is proportional to the density of the liquid times the square of its velocity. In addition, the force is inversely proportional to the elbow's radius.

Positive-Displacement Meters

Operation of these units consists of separating liquids into accurately measured increments and moving them on. Each segment is counted by a connecting register. Because every increment represents a discrete volume, positive-displacement units are popular for automatic batching and accounting applications. Positive-displacement meters are good candidates for measuring the flows of viscous liquids or for use where a simple mechanical meter system is needed.

Figure 5:
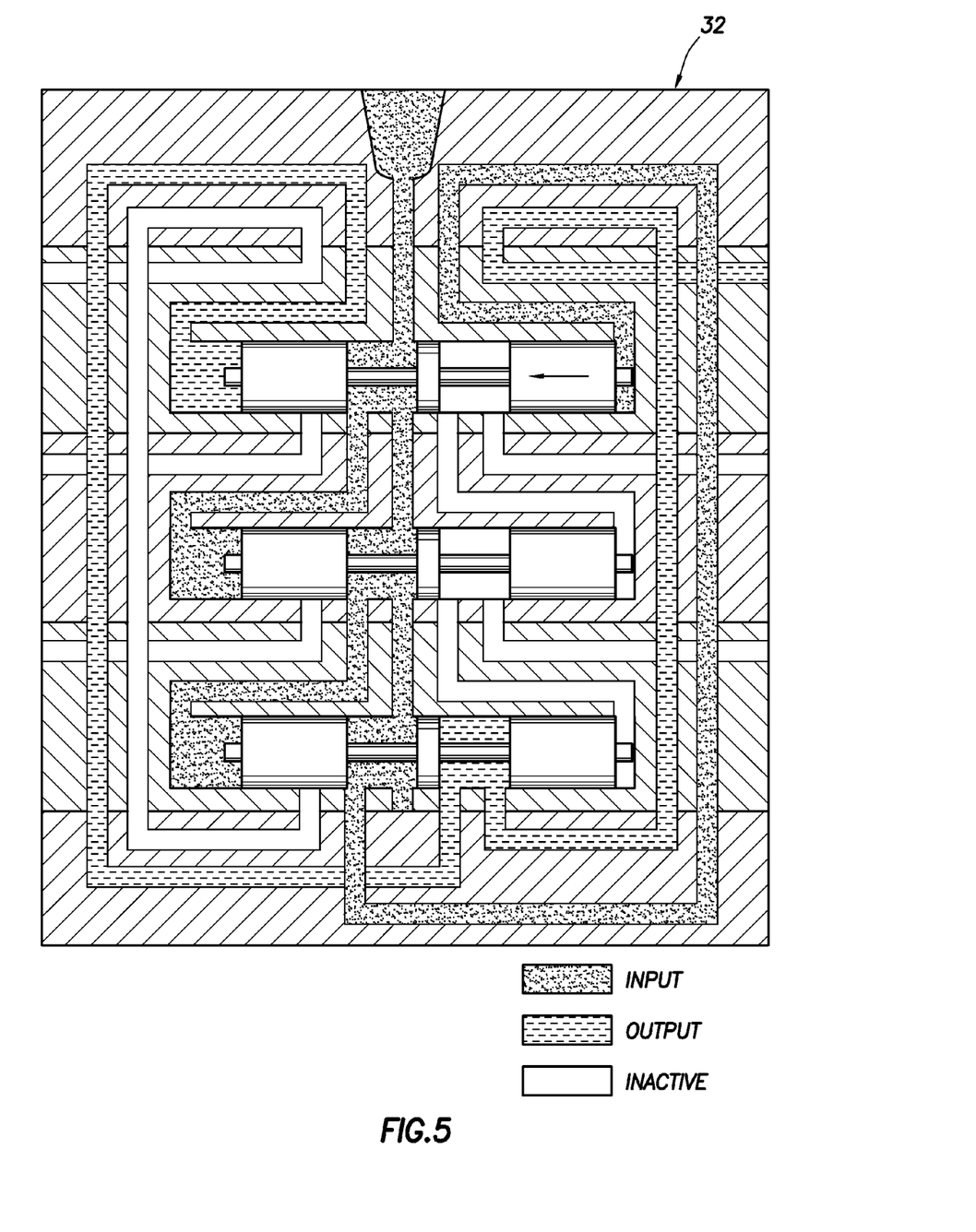
FIG. 5 depicts the flow in a divider valve that may used as part of the flow meter of the lubricating system described herein.

Reciprocating piston meters are of the single and multiple-piston types and including series progressive type of meter. The specific choice depends on the range of flow rates required in the particular application. Piston meters can be used to handle a wide variety of liquids. A magnetically driven, oscillating piston meter is shown in FIG. 5. Liquid never comes in contact with gears or other parts that might clog or corrode. When a series progressive type of meter is used, a precise amount of lube is passed from the inlet and measured in each chamber before passing to the outlet of the meter.

Oval-gear meters have two rotating, oval-shaped gears with synchronized, close fitting teeth. A fixed quantity of liquid passes through the meter for each revolution. Shaft rotation can be monitored to obtain specific flow rates.

Nutating-disk meters have a moveable disk mounted on a concentric sphere located in a spherical side-walled chamber. The pressure of the liquid passing through the measuring chamber causes the disk to rock in a circulating path without rotating about its own axis. It is the only moving part in the measuring chamber.

A pin extending perpendicularly from the disk is connected to a mechanical counter that monitors the disk's rocking motions. Each cycle is proportional to a specific quantity of flow. As is true with all positive-displacement meters, viscosity variations below a given threshold will affect measuring accuracies. Many sizes and capacities are available. The units can be made from a wide selection of construction materials.

Rotary-vane meters are available in several designs, but they all operate on the same principle. The basic unit consists of an equally divided, rotating impeller (containing two or more compartments) mounted inside the meter's housing. The impeller is in continuous contact with the casing. A fixed volume of liquid is swept to the meter's outlet from each compartment as the impeller rotates. The revolutions of the impeller are counted and registered in volumetric units.

Helix flowmeters consist of two radically pitched helical rotors geared together, with a small clearance between the rotors and the casing. The two rotors displace liquid axially from one end of the chamber to the other.

Velocity Meters

These instruments operate linearly with respect to the volume flow rate. Because there is no square-root relationship (as with differential pressure devices), their rangeability is greater. Velocity meters have minimum sensitivity to viscosity changes when used at Reynolds numbers above 10,000. Most velocity-type meter housings are equipped with flanges or fittings to permit them to be connected directly into pipelines.

Turbine meters have found widespread use for accurate liquid measurement applications. The unit consists of a multiple-bladed rotor mounted with a pipe, perpendicular to the liquid flow. The rotor spins as the liquid passes through the blades. The rotational speed is a direct function of flow rate and can be sensed by magnetic pick-up, photoelectric cell, or gears. Electrical pulses can be counted and totalized.

The number of electrical pulses counted for a given period of time is directly proportional to flow volume. A tachometer can be added to measure the turbine's rotational speed and to determine the liquid flow rate. Turbine meters, when properly specified and installed, have good accuracy, particularly with low-viscosity liquids.

A major concern with turbine meters is bearing wear. A "bearingless" design has been developed to avoid this problem. Liquid entering the meter travels through the spiraling vanes of a stator that imparts rotation to the liquid stream. The stream acts on a sphere, causing it to orbit in the space between the first stator and a similarly spiraled second stator. The orbiting movement of the sphere is detected electronically. The frequency of the resulting pulse output is proportional to flow rate.

Vortex meters make use of a natural phenomenon that occurs when a liquid flows around a bluff object. Eddies or vortices are shed alternately downstream of the object. The frequency of the vortex shedding is directly proportional to the velocity of the liquid flowing through the meter.

The three major components of the flowmeter are a bluff body strut-mounted across the flowmeter bore, a sensor to detect the presence of the vortex and to generate an electrical impulse, and a signal amplification and conditioning transmitter whose output is proportional to the flow rate. The meter is equally suitable for flow rate or flow totalization measurements. Use for slurries or high viscosity liquids is not recommended.

Swirl Meter The principle of operation of a swirl flowmeter is as follows. The meter body has a set of blades welded at the inlet, called the swirler. These blades impart a tangential velocity (or swirl) to liquids, gases or vapors. The fluid is then accelerated by a reduction in the meter body bore. A piezo-electric sensor is located in the center of the meter at the point of maximum fluid velocity. Flow is then decelerated as it approaches the meter outlet by an increase in meter body bore. A deswirler is welded to the meter body near the outlet. This deswirler eliminates the tangential velocity imparted to the fluid at the inlet so that other instrumentation downstream of the meter will not be affected by its operation.

A swirl flowmeter consists of the flowmeter body and an electronics housing (the electronics can be remote mounted for safety or convenience). Swirlmeters are only available with flanged meter bodies. A wafer option is not available, as there is for vortex meters. Swirlmeters use the same sensors and electronics as vortex meters, only the meter bodies differ in design. Swirlmeters are most cost effective with stainless steel construction, although Hastelloy is also offered. Swirlmeters are available in sizes from ½ to 16 inches, and have options for ANSI 150, 300 or 600 mating flanges.

The primary rotation caused by the swirler has at its core a low-pressure zone. The low-pressure zone is thrown into a secondary rotation proportional to flow rate. This rotating low-pressure zone can be likened to a helical coil. At low flow rates, the low-pressure swirls are farther apart (the helical coil is stretched out). At higher flows, the low-pressure swirls are closer together (the coil is compressed). Areas of slightly higher pressure separate the low-pressure swirls. The sensor will deflect (to the left and then to the right) as a pressure swirl passes from one side to other. The alternating deflection of the sensor produces a sine wave voltage output, similar to the output shown in the vortex section. The frequency of this output voltage is the same frequency as the rotating low-pressure zones, and is therefore proportional to the volumetric flow rate.

The swirl flowmeter factor does not exhibit the same deviation at high Reynolds numbers as does the vortex meter factor. This has been verified by testing on water and air at independent facilities. For this reason, a swirlmeter factor determined by water calibration is universally valid for all fluids. The swirlmeter, based on the water calibration, has a published accuracy of 0.5 percent of rate for liquids, gases or steam.

As with the vortex meter, swirlmeter rangeability is fixed by the size of the meter and the fluid properties. The sensor requires a minimum strength pressure pulse to be able to distinguish the flow signal from hydraulic noise. While turbulent flow is required at all times, the swirlmeter does not have the same limitation on Reynolds number, as does the vortex meter and can generally measure lower flows. On the other hand, the swirlmeter body presents more of an obstruction to flow than does the vortex meter, and creates higher permanent head losses under similar conditions. For this reason, the swirlmeter does not measure flow rates as high as the vortex meter. The swirlmeter, like the vortex meter, averages 10:1 turndowns or higher on liquids, and 20:1 or higher on gases and vapors. However, the flow range of a 2-inch swirlmeter will be different than the flow range of a 2-inch vortex meter under the same operating conditions. Just as for a vortex meter, you select the swirlmeter size to achieve a desired flow range given the process conditions, and never to match the process piping. Swirlmeters have to be downsized (using a 2-inch meter for 3-inch process piping) less frequently than vortex meters. Free computer software is available from manufacturers that make sizing swirl flowmeters quick and easy.

Swirl Flowmeter Application Information

Swirlmeters cost about 50 percent more than the same size vortex meter because of the added complexity and welding requirements. The rule of thumb is to use the vortex meter whenever possible for cost, and use the swirlmeter for:
  Tight piping situations.
  More viscous liquids (8 cp<μ<30 cp).
  Lower flow measurement capability.
  Higher accuracy on gases and steam.
  When downsizing to install a vortex meter is not feasible (head loss).
  These meters are compatible with low viscosity (<30 cp) liquids, gases and steam.

Swirlmeters are less affected by as many real world parameters as orifice plates and turbine meters, and are less sensitive to piping effects than vortex meters. Swirlmeters require just 3 diameters of straight pipe upstream (regardless of bends, valves, etc.), and either 1 or 3 diameters of straight pipe downstream (the latter only required when a control valve is downstream of the meter).

Like vortex meters, they measure velocity and infer actual volumetric flow rate from the known geometry of the meter body. Swirlmeters are generally used with flow computers to measure flow in standard volumetric or mass units (along with external pressure and/or temperature measurements). The flow computer is not necessary if the fluid density is constant. A pressure tap is provided on the meter body for making the pressure measurement (using an external sensor). The temperature element should be located downstream of the meter if needed.

The swirlmeter does not measure to true zero flow. There is a flow cut-off point below which the meter output is automatically clamped at zero (4 mA for analog output). For most applications, this limitation does not pose a problem, as the swirlmeter has good low flow capability. However, this can be a draw back for applications where flows during start-up or shutdown operations, or other upset conditions, can be greatly different than under normal operating conditions. Users may need an indication of flow under such upsets, even if they do not need to measure flow accurately, making use of the swirlmeter questionable.

Swirlmeters may also be questionable for some batching applications, especially if the pipe does not remain full between batches. The meter will not register flow as the fluid accelerates from zero to the cut-off value, and as the fluid decelerates back to zero at the end of the batch. Swirlmeters are unidirectional and will not measure or subtract any backflow from the batch total. This may create significant measurement errors, depending on the system dynamics, and the size of the batch.

There may be a potential problem installing swirlmeters on existing processes where the flow range to be measured is completely unknown. Many times, the instrument engineer makes an educated guess on flow range. A swirlmeter sized for the wrong flow range, or wrong process conditions, may need to be replaced by a different size meter entirely. Other devices, like magnetic flow meters, orifice plates and turbine meters, are more forgiving, and can be easily adapted to fit the actual process conditions after installation.

Measuring gas flows when the process pressure is low (low-density gases) is less of a problem for swirlmeters than for vortex meters. Low-density gases can be measured with a swirlmeter, however rangeability may be less than the 20:1 mentioned previously, and extreme care must be taken in selecting the correct size meter.

Measurement of multi-phase flow has lower accuracy than for single-phase fluids. The meter will measure the flow of all phases present and report it as all liquid or gas (depending on how the meter is configured). The secondary phase should be removed, if feasible, before the meter for the highest accuracy. Any secondary phase should be homogeneously dispersed and should not have any potential for sticking to or coating the meter. There is no evidence to suggest that a swirlmeter has any advantage over a vortex meter in regards to measuring multi-phase flow.

Pressure drop must also be considered when selecting a swirlmeter. Flashing and cavitation have an adverse affect on meter accuracy, and can damage the meter itself. It was previously stated that a swirlmeter produces higher head loss than a vortex meter under the same conditions, up to five times higher. However, this is not a fair comparison. In real practice, the head loss for the swirlmeter is about the same as for the vortex meter, because you generally use a larger size swirlmeter than vortex meter to handle the same application. Fluids that tend to form coatings are bad applications for swirlmeters.

Electromagnetic meters can handle most liquids and slurries, providing that the material being metered is electrically conductive. Major components are the flow tube (primary element). The flow tube mounts directly in the pipe. Pressure drop across the meter is the same as it is through an equivalent length of pipe because there are no moving parts or obstructions to the flow. The voltmeter can be attached directly to the flow tube or can be mounted remotely and connected to it by a shielded cable.

Electromagnetic flow meters operate on Faraday's law of electromagnetic induction that states that a voltage will be induced when a conductor moves through a magnetic field. The liquid serves as the conductor; the magnetic field is created by energized coils outside the flow tube. The amount of voltage produced is directly proportional to the flow rate. Two electrodes mounted in the pipe wall detect the voltage, which is measured by the secondary element.

Electromagnetic flow meters have major advantages: They can measure difficult and corrosive liquids and slurries; and they can measure forward as well as reverse flow with equal accuracy. Disadvantages of earlier designs were high power consumption, and the need to obtain a full pipe and no flow to initially set the meter to zero. Recent improvements have eliminated these problems. Pulse-type excitation techniques have reduced power consumption, because excitation occurs only half the time in the unit. Zero settings are no longer required.

Ultrasonic Flowmeters can be Divided into Doppler Meters and Time-of-Travel (or Transit) Meters.

Doppler meters measure the frequency shifts caused by liquid flow. Two transducers (one to transmit and the other to receive signal) are mounted in a case attached to one side of the pipe. A signal of known frequency is sent into the liquid to be measured. Solids, bubbles, or any discontinuity in the liquid, cause the pulse to be reflected to the receiver element. Because the liquid causing the reflection is moving, the frequency of the returned pulse is shifted. The frequency shift is proportional to the liquid's velocity.

A portable Doppler meter capable of being operated on AC power or from a rechargeable power pack has recently been developed. The sensing heads are simply clamped to the outside of the pipe, and the instrument is ready to be used. Total weight, including the case, is 22 lb. A set of 4 to 20 millampere output terminals permits the unit to be connected to a strip chart recorder or other remote device.

Because solids particles or entrained gases are required for measurement, Doppler meters are not appropriate for clean liquids. In general, Doppler flowmeters are less accurate than TOF flowmeters, however, they are less expensive.

Time-of-travel (Transit-Time) meters have transducers mounted on each side of the pipe. The configuration is such that the sound waves traveling between the devices are at a 45 deg. angle to the direction of liquid flow. The speed of the signal traveling between the transducers increases or decreases with the direction of transmission and the velocity of the liquid being measured. A time-differential relationship proportional to the flow can be obtained by transmitting the signal alternately in both directions.

A limitation of time-of-travel meters is that the liquids being measured must be relatively free of entrained gas or solids to minimize signal scattering and absorption.

Mass Flowmeters

The continuing need for more accurate flow measurements in mass-related processes (chemical reactions, heat transfer, etc.) has resulted in the development of mass flowmeters. Various designs are available, but the one most commonly used for liquid flow applications is the Coriolis meter. Its operation is based on the natural phenomenon called the Coriolis force, hence the name.

Coriolis meters are true mass meters that measure the mass rate of flow directly as opposed to volumetric flow. Because mass does not change, the meter is linear without having to be adjusted for variations in liquid properties. It also eliminates the need to compensate for changing temperature and pressure conditions. The meter is especially useful for measuring liquids whose viscosity varies with velocity at given temperatures and pressures.

Coriolis meters are also available in various designs. A popular unit consists of a U-shaped flow tube enclosed in a sensor housing connected to an electronics unit. The sensing unit can be installed directly into any process. The electronics unit can be located up to 500 feet from the sensor.

Inside the sensor housing, the U-shaped flow tube is vibrated at its natural frequency by a magnetic device located at the bend of the tube. The vibration is similar to that of a tuning fork, covering less than 0.1 in. and completing a full cycle about 80 times/sec. As the liquid flows through the tube, it is forced to take on the vertical movement of the tube. When the tube is moving upward during half of its cycle, the liquid flowing into the meter resists being forced up by pushing down on the tube.

Having been forced upward, the liquid flowing out of the meter resists having its vertical motion decreased by pushing up on the tube. This action causes the tube to twist. When the tube is moving downward during the second half of its vibration cycle, it twists in the opposite direction.

Having been forced upward, the liquid flowing out of the meter resists having its vertical motion decreased by pushing up on the tube. This action causes the tube to twist. When the tube is moving downward during the second half of its vibration cycle, it twists in the opposite direction. The amount of twist is directly proportional to the mass flow rate of the liquid flowing through the tube. Magnetic sensors located on each side of the flow tube measure the tube velocities, which change as the tube twists. The sensors feed this information to the electronics unit, where it is processed and converted to a voltage proportional to mass flow rate. The meter has a wide range of applications from adhesives and coatings to liquid nitrogen.

This meter has extremely high accuracy but can also cause a high pressure drop.

Thermal-type mass flow meters have traditionally been used for gas measurements, but designs for liquid flow measurements are available. These mass meters also operate independent of density, pressure, and viscosity. Thermal meters use a heated sensing element isolated from the fluid flow path. The flow stream conducts heat from the sensing element. The conducted heat is directly proportional to die mass flow rate. The sensor never conies into direct contact with the liquid. Through pre-existing built-in calibrations, the temperature differential is translated to mass flow. The accuracy of the thermal mass flow device is dependent on the reliability of the calibrations of the actual process gas or liquid and variations in the temperature, pressure, flow rate, heat capacity and viscosity of the fluid. The electronics package includes the flow analyzer, temperature compensator, and a signal conditioner that provides a linear output directly proportional to mass flow.

Open Channel Meters

The "open channel" refers to any conduit in which liquid flows with a free surface. Included are tunnels, nonpressurized sewers, partially filled pipes, canals, streams, and rivers. Of the many techniques available for monitoring open-channel flows, depth-related methods are the most common. These techniques presume that the instantaneous flow rate may be determined from a measurement of the water depth, or head. Weirs and flumes are the oldest and most widely used primary devices for measuring open-channel flows.

Weirs operate on the principle that an obstruction in a channel will cause water to back up, creating a high level (head) behind the barrier. The head is a function of flow velocity, and, therefore, the flow rate through the device. Weirs consist of vertical plates with sharp crests. The top of the plate can be straight or notched. Weirs are classified in accordance with the shape of the notch. The basic types are V-notch, rectangular, and trapezoidal.

Flumes are generally used when head loss must be kept to a minimum, or if the flowing liquid contains large amounts of suspended solids. Flumes are to open channels what venturi tubes are to closed pipes. Popular flumes are the Parshall and Palmer-Bowlus designs.

The Parshall flume consists of a converging upstream section, a throat, and a diverging downstream section. Flume walls are vertical and the floor of the throat is inclined downward. Head loss through Parshall flumes is lower than for other types of open-channel flow measuring devices. High flow velocities help make the flume self-cleaning. Flow can be measured accurately under a wide range of conditions.

Palmer-Bowlus flumes have a trapezoidal throat of uniform cross section and a length about equal to the diameter of the pipe in which it is installed. It is comparable to a Parshall flume in accuracy and in ability to pass debris without cleaning. A principal advantage is the comparative ease with which it can be installed in existing circular conduits, because a rectangular approach section is not required.

Discharge through weirs and flumes is a function of level, so level measurement techniques must be used with the equipment to determine flow rates. Staff gages and float-operated units are the simplest devices used for this purpose. Various electronic sensing, totalizing, and recording systems are also available.

A more recent development consists of using ultrasonic pulses to measure liquid levels. Measurements are made by sending sound pulses from a sensor to the surface of the liquid, and timing the echo return. Linearizing circuitry converts the height of the liquid into flow rate. A strip chart recorder logs the flow rate, and a digital totalizer registers the total gallons. Another recently introduced microprocessor-based system uses either ultrasonic or float sensors. A keypad with an interactive liquid crystal display simplifies programming, control, and calibration tasks.

As shown in FIG. 5, a positive displacement flow meter 18 useful in connection with the lubricating system provided herein comprises a divider valve 32 and a cycle indicator proximity switch 34. The divider valve 32, shown in FIG. 5 can precisely proportion a volume of oil to satisfy the different requirements of every point in the tube system. Divider valves are generally designed to deliver lubricant up to 16 points. However, in the present lubricating system, the divider valve 32 is used only for a single flow. A cycle indicator proximity switch (not shown) is used in the divider valve 32 to provide a signal to a monitor, controller or programmable logic controller to indicate the cycle rate.

In operation, proximity switches are installed in place of a piston enclosure plug in one the working sections of the divider valve assembly. These switches are actuated by movements of the lube-dispensing piston inside the working section of the divider valve, and thereby send a signal to the computer operated controller indicating the rate and amount of activity of the proportioning divider as lubricant is pumped through it.

There are different types of proximity switches available reed-type, field sensing magnetic and field sensing mechanical. The reed-type switch is available for oil only applications. The field sensitive magnetic proximity switch is a dry contact, ceramic magnet operated switch also useful for oil or grease applications. The field sensitive magnetic proximity switch is reliable even when used in low signal power conditions common to DC-powered PLC's. The field sensing mechanical switch is a magnetically activated proximity switch that contains a miniature snap-action switch activated by the attraction of its internal magnet to the divider valve's moving piston.

A regulating valve 22 is positioned before the inlet of the pressured feed pump 10 to protect the pump from excessive pressure by the low pressure supply pump 12. Regulating valves are commonly used for such functions. One type of regulator valve that can be used in connection with this lubrication system is manufactured by Norgren out of Littleton Colo. who offers a miniature brass body regulator for compressed air service. This particular valve has a bonnet equipped with pressure adjusting screw to adjust manually. The valve can be disassembled without the use of tools or being removed from the line. Alternative regulator valves useful in connection with the lubricating system may be adjustable via computer control with feedback to the low pressure supply pump 12.

Useful filters 24 and 26 can be of a variety of configurations and include standard cartridge units, dual cartridge units, modular filter sections, spin on filter assemblies, and lubricant strainers. Strainers are available in Block-Type and Y-Type configurations and are such as utilized in heavy oil and grease lubrications systems for protecting pumps, divider valves and machine tooled components.

Depending upon the lubrication system design and requirements, the computer system then uses the feed back signals from the proximity switch to start and stop the lubrication cycle periodically. If the computer does not receive the expected signal within the period of time specified, the computer system can initiate various responses as specified by a user including a audible and/or visual warning, or by sending an electronic signal to yet a another computer or device.

In the present lubricating system, the high pressure lubrication pump 10 can deliver pressurized food-grade oil up to 60,000 psi. The system eliminates need for manually counting drops. The second reservoir 16 contains food grade lubrication oil ultimately supplied to the machinery injection points. Hence, heavyweight gear oil is used in the first reservoir 14 to reduce wear on the camshaft, lever and bushing.

In this closed loop system, food grade oil is pressurized up to 400 psi by an electric or pneumatic pump in order force the oil through the filter and the flow meter. A pressure relief valve removes excess pressure relief valve will remove the pressure in order not to over pressure the pump inlet oil pressure.

Figure 4:
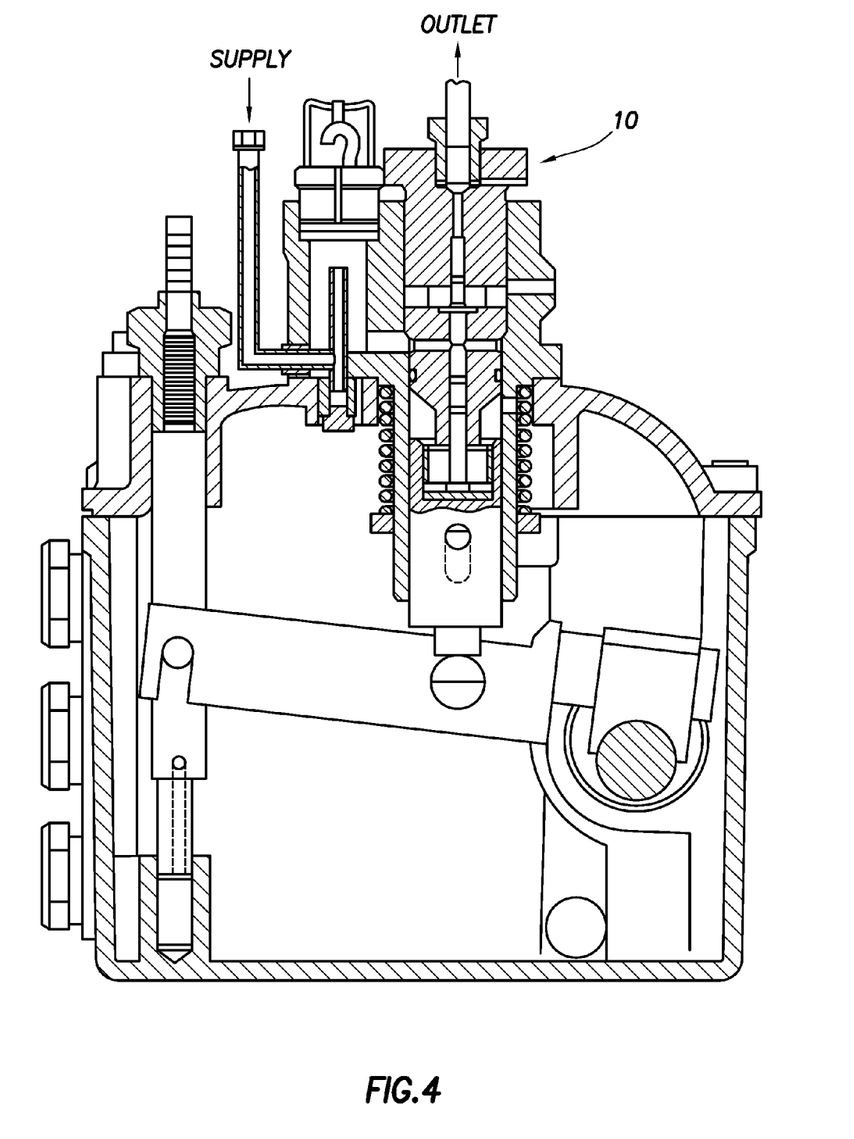
FIG. 4 is a cross section of the pressurized pump useful in connection with the high pressure lubricating system provided herein.

As shown in FIGS. 3 and 4, the lubricating system can use a pressurized feed pump as opposed to a suction feed pump. In this case, rotation of the lubricator cam actuates the pump rocker arm assembly to operate the pump piston. On the piston down-stroke, spring pressure is exerted on the piston causing it to follow the cam. As it moves down, a vacuum is created between the piston and the discharge check valve and the valve closes. The pressurized supply unseats the supply inlet shut-off ball and pressurizes the piston bore with lubricant. On the piston up-stroke, the piston forces the supply inlet shut-off ball to seat and shut off the pressurized supply. Food grade oil (lubricant) in the piston cylinder is forced out through the discharge check valve to the machine injection point.

Each pump can be adjusted by means of an external screw. This changes the length of the pump stroke which changes the pump discharge volume. In short, pump displacement is controlled by the position of a regulating lever fulcrum. When a feed regulator nut is turned clockwise to its furthest point, a graduated regulator rod will project its greatest distance. The regulating lever fulcrum will then be at its highest point, and the plunger will displace a maximum of fluid. Fluid displacement occurs in that portion of the cylinder above the inlet port and is a function of plunger travel. However, the pump discharge flow can be monitored, controlled and adjusted via a computer control system.

For system automation and/or closed loop control, an actuator (rotary, linear, etc. . . . ) may be used to adjust the pressurized feed pump which is then controlled by a PLC or other suitable computer. A signal from the flow meter would give feedback to the PLC to adjust the pump's output flow to a precise rate. Adjustment would be required to compensate for any changes in the operating parameters, compressor speed changes, media changes and the like. All of these operating parameters would be inputs to the PLC or other computer system.

We claim:

1. An improved pump-to-point, closed loop lubricating system for high pressure machinery comprising a pressurized feed pump for supplying food grade oil to the high pressure machinery wherein the pressurized feed pump comprises a cam, a lever and a bushing, a first reservoir containing lubricating oil for lubricating the cam, the lever and the bushing of the pressurized feed pump, a second reservoir containing the food grade oil for use in the high pressure machinery, and a differential pressure flow meter wherein an amount of food grade oil is supplied to the high pressure machinery from the second reservoir via the flow meter by the pressurized feed pump at one or more machine injection points, the food grade oil is not in contact with the cam, the lever and the hushing of the pressurized feed pump and is monitored by said flow meter connected to a computer, the computer being capable of producing an audible and/or visual warning, shutting down the system or adjusting the flow of lubricant to the pressurized feed pump or machine injection point.

2. The lubricating system of claim 1, wherein the high pressure machinery is a gas compressor.

3. The lubricating system of claim 1, wherein food grade oil is pumped through the flow meter via a supply pump.

4. The lubricating system of claim 3, further comprising a regulating valve, wherein the regulating valve is positioned before the pressurized feed pump protecting the pressurized feed pump from excessive pressure by the supply pump.

5. The lubricating system of claim 1, wherein the flow meter is a magnetically driven, oscillating piston meter.

* * * * *